UNITED STATES PATENT OFFICE.

THOMAS HAWKS, OF ROCHESTER, NEW YORK.

IMPROVEMENT IN THE MANUFACTURE OF MALT-SIRUPS.

Specification forming part of Letters Patent No. 48,396, dated June 27, 1865.

*To all whom it may concern:*

Be it known that I, THOMAS HAWKS, of the city of Rochester, in the county of Monroe and State of New York, have invented a new and Improved Process for Producing Malt-Sirup or a Saccharine Extract of Grain; and I do hereby declare that the following is a full and exact description thereof.

My invention has for its object the production of a sirup of sugar from malt and Indian corn by a cheap and expeditious process, as hereinafter described, and the condensation of the liquid extract *in vacuo* to the proper consistency for use as an edible or for crystallization into sugar by subsequent treatment.

For my process malt is prepared from barley in the usual manner for malt-liquors. It is ground or crushed between rollers and placed in a mash-tub provided with a perforated false bottom, and water at a temperature of 175° to 180° is admitted below the perforated bottom, through which it rises, mixing with and saturating the crushed malt. It is then thoroughly stirred, and allowed to stand an hour, when a quantity equal to the amount of finely-ground meal of Indian corn is added to the mash, and thoroughly mixed by stirring. After this it should remain in the mash-tub two hours, or thereabout, meanwhile being stirred several times. The liquor is then drawn off and water is again added to the grain at a temperature of about 200°, and again allowed to remain for about two hours, with frequent stirring. This may be repeated two or three times, until the saccharified matter has all been extracted from the grain. The liquor is then subjected to boiling and cleansed by the use of gelatine, in the usual manner, to remove impurities, when it is evaporated to the consistency of thick sirup in a vacuum-condenser, in which state it is ready for the market or for use.

It is known that diastase is a product of the fermentation of barley-malt, and that it possesses the property of converting starch into sugar when mixed with a sufficient quantity of water and maintained at a temperature above 150° and below boiling. By my process this quality of diastase is employed to saccharify the starch directly from the meal of Indian corn without the previous separation of the starch. The diastase of the malt, being soluble in water, is taken up by it, and on the admixture of the meal is brought in contact with the fecula which it contains, immediately saccharifying it, and this product is dissolved by the frequent washings of the grain in the mash-tub, the result being a saccharine solution which requires only to be clarified and condensed by the evaporation to the proper bulk and consistency.

What I claim as my invention, and desire to secure by Letters Patent, is—

1. The method and process of producing a sirup of sugar from malt and meal of Indian corn, substantially as herein described.

2. As a new product, a sirup of sugar produced from malt and the meal of Indian corn without any previous separation of the fecula thereof, substantially as set forth.

THOMAS HAWKS.

Witnesses:
J. FRASER,
JAY HYATT.